United States Patent
Tseng

(10) Patent No.: US 6,971,753 B2
(45) Date of Patent: Dec. 6, 2005

(54) PROJECTING SYSTEM WITH AN IMAGE-CAPTURING DEVICE

(75) Inventor: Ta-Lin Tseng, Taipei Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 0 days.

(21) Appl. No.: 10/708,061

(22) Filed: Feb. 6, 2004

(65) Prior Publication Data

US 2004/0257534 A1 Dec. 23, 2004

(30) Foreign Application Priority Data

Jun. 20, 2003 (TW) ................................ 92116889 A

(51) Int. Cl.$^7$ ............................................. G03B 21/14
(52) U.S. Cl. ........................ 353/122; 353/42; 345/157; 345/158
(58) Field of Search ................... 353/42, 122; 345/157, 345/158

(56) References Cited

U.S. PATENT DOCUMENTS

| | | | |
|---|---|---|---|
| 5,235,363 A * | 8/1993 | Vogeley et al. | 353/122 |
| 5,515,079 A * | 5/1996 | Hauck | 345/157 |
| 5,738,429 A * | 4/1998 | Tagawa et al. | 353/122 |
| 6,275,214 B1 * | 8/2001 | Hansen | 345/158 |
| 6,454,419 B2 * | 9/2002 | Kitazawa | 353/122 |
| 6,512,507 B1 * | 1/2003 | Furihata et al. | 345/157 |
| 6,558,002 B1 * | 5/2003 | Miyashita | 353/42 |
| 6,710,767 B1 * | 3/2004 | Hasegawa et al. | 345/157 |
| 2003/0128187 A1 * | 7/2003 | Strubbe | 345/157 |
| 2003/0169233 A1 * | 9/2003 | Hansen | 345/158 |
| 2004/0169639 A1 * | 9/2004 | Pate et al. | 345/157 |
| 2004/0263476 A1 * | 12/2004 | Lim et al. | 345/157 |

* cited by examiner

*Primary Examiner*—William C. Dowling
(74) *Attorney, Agent, or Firm*—Winston Hsu

(57) ABSTRACT

A projecting system for projecting an image onto a screen includes a projector and an image-capturing device. The projector includes a light source, a beam splitter for splitting a beam generated by the light source into a visible beam and an invisible beam, a first image-forming device for modulating the invisible beam to form a first image, a second image-forming device for modulating the visible beam to form a second image, and a prism for projecting the first image and the second image onto the screen. The image-capturing device includes an output unit for outputting a first part of the first image at a first time and a second part of the first image at a second time, and a data processor for receiving data from the output unit and changing the position of the cursor according to the first and the second part of the first image.

18 Claims, 5 Drawing Sheets

PROJECTING SYSTEM WITH AN IMAGE-CAPTURING DEVICE

BACKGROUND OF INVENTION

1. Field of the Invention

The present invention relates to a projecting system, and more specifically, to a projecting system with an image-capturing device for controlling a cursor.

2. Description of the Prior Art

When a computer is connected to a projector to project an image onto a screen, a control device for controlling a cursor on the screen is required. Example control devices include a mouse, a trackball, and a joystick. Generally, a mouse has a roller ball, the rotation of the roller ball will be detected when the mouse slides over a surface to determine the distance and the direction of mouse movement so as to move the cursor. In order to use the roller ball on different surfaces, the initial position of the roller ball does not relate to any position on the screen. The usage of the trackball is similar to the mouse; but the roller ball of the trackball is fixed to a fixed location, and the rotation of the roller ball of the trackball will be detected to determine the moving distance and the moving direction of the cursor. In addition, a joystick is a rod type controller to control the movement for two coordinate axes. Although the physical moving direction of the joystick is corresponding to the movement of the cursor on the screen, it is not easy to control the joystick. The cursor on the screen may move in different speed when the joystick is positioned in different angles, so that the user is required of a well-trained skill.

Several remote control systems for a computer have been developed according to the requirements and favorites of users. As communication technology progresses, wireless communications, such as ultrasonic, infrared or radio frequency systems, establish a communication link between a remote controller and the computer allowing users to control the computer and the cursor in a more convenient manner. In a typical remote control system, a sensor is generally installed on the controller, the computer, or the screen to detect a relative position of the cursor. However, in practice, the length, the width, and the range of the space where the user is located will influence the controlling of the cursor. For example, complicated and expensive systems are not appropriate in smaller spaces.

Besides the computer screen, a large-sized display device such as a projector is also a video interactive tool. A simple controller is required, for example, a controller is required to turn over to another slide when displaying slides. In addition, for a presentation of a software introduction or training program, a simplified controller is preferred to allow the user to control the cursor directly on the projecting screen.

In some projectors, a CCD is installed for detecting some special image on the projecting screen. For instance, when the user indicates a place on the screen with a laser light pen, a laser beam is reflected by the screen to the projector and detected by the CCD. In such a manner, the projector can move the cursor automatically to the place user indicated. It is very convenient for the user to move the cursor directly. However, when using a projector with a CCD, the laser beam will point to any place on the screen, and the projector is required to process more data. Additionally, the laser is harmful to human eyes so the laser light pen has a safety problem.

As mentioned above, when a computer is connected to a projector, a controller for moving the cursor of the computer is needed. Typical controllers such as a mouse, a trackball, or a joystick are less movable. A laser light pen is highly movable but harmful to eyes and has a safety problem.

SUMMARY OF INVENTION

It is therefore a primary objective of the present invention to provide a projecting system to solve the problems mentioned above.

Briefly summarized, a projecting system for projecting an image onto a screen includes a projector, an image-capturing device, and a data processor. The projector includes a light source, a beam splitter, a first image-forming device, a second image-forming device, and a prism. The beam splitter is installed on a side of the light source, and used for splitting a light beam generated by the light source into a visible beam and an invisible beam. The first image-forming device modulates the invisible beam to form a first image. The second image-forming device modulates the visible beam to form a second image which includes at least one cursor. The prism projects the first image and the second image onto the screen. The image-capturing device includes an output unit for outputting the first image captured by the image-capturing device. The output unit outputs a first part of the first image at a first time and outputs a second part of the first image at a second time. The data processor receives data from the output unit and changes the position of the cursor according to the first part and the second part of the first image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
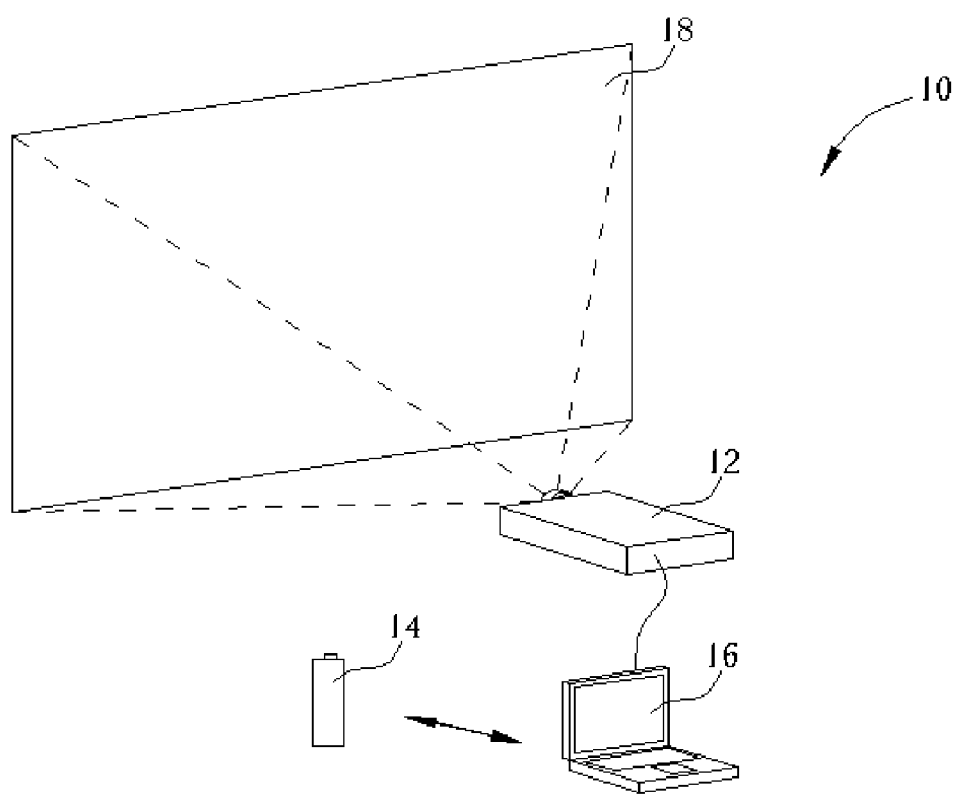
FIG. 1 illustrates a projecting system according to the present invention.
Figure 2:
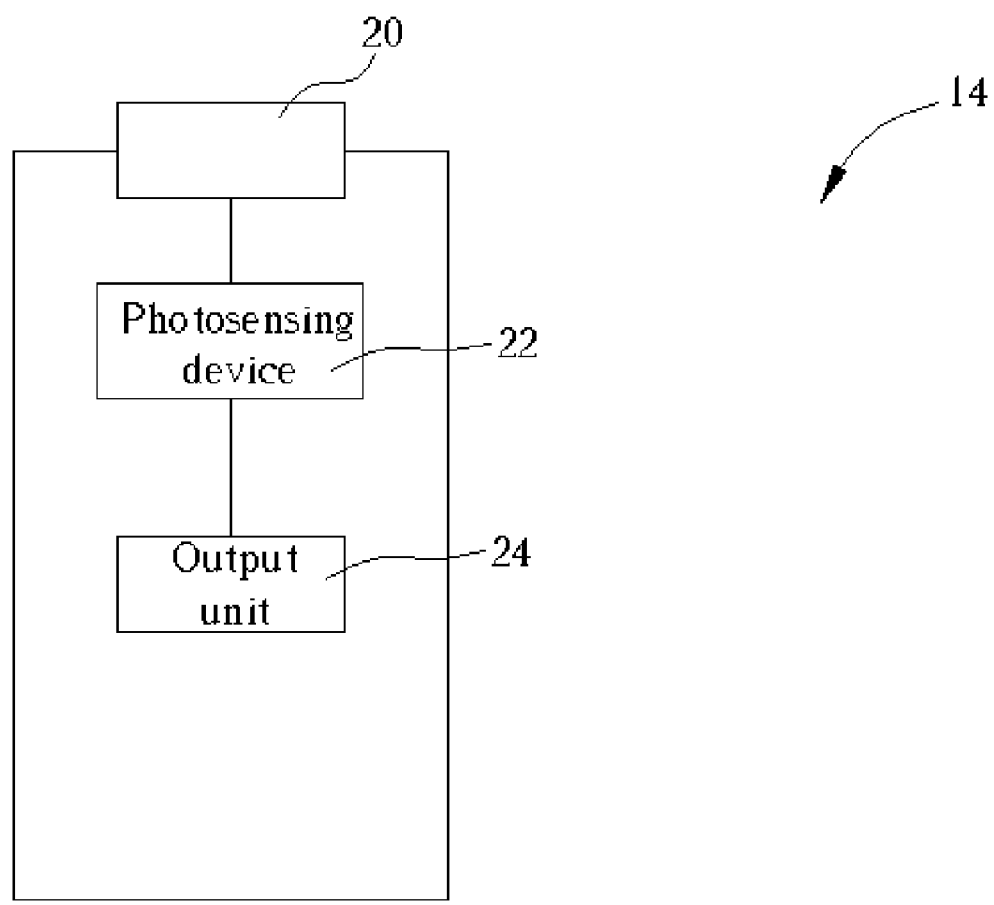
FIG. 2 illustrates the internal structure of the image-capturing device in FIG. 1.
Figure 3:
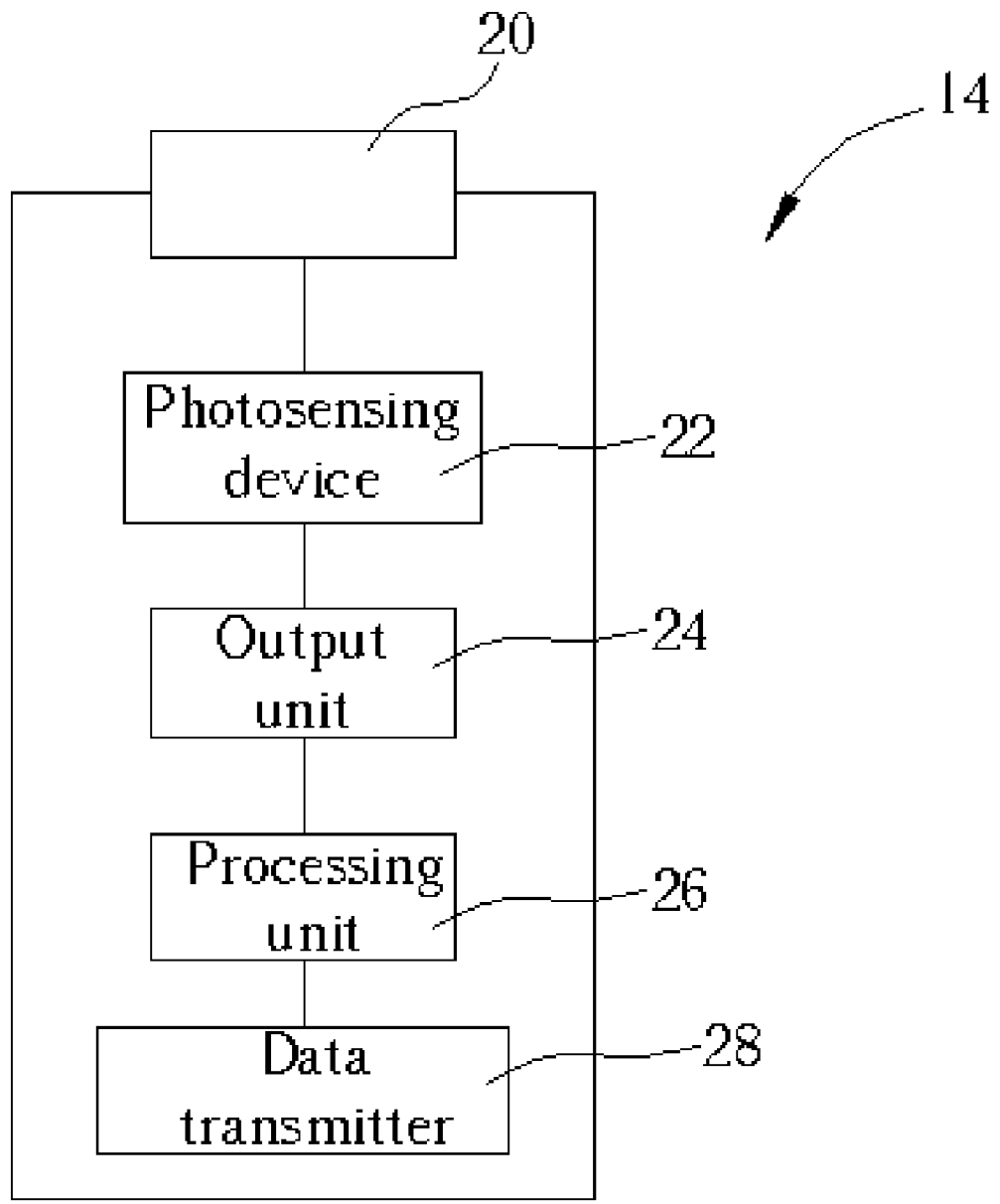
FIG. 3 illustrates another internal structure of the image-capturing device in FIG. 1.

Please refer to FIG. 1 showing a projecting system 10 according to the present invention, and FIG. 2 and FIG. 3 showing the internal structure of an image-capturing device 14 in FIG. 1. As shown in FIG. 1, the projecting system 10 includes a projector 12, the image-capturing device 14, and a data processor 16. The projector 12 is connected to the data processor 16 by a transmission line or wirelessly by ultrasonic, infrared, or radio frequency signals. The data processor 16 may be a desktop computer, a notebook computer, or a personal digital assistance (PDA). The image proceeded by the data processor 16 can be projected to a screen 18. The image-capturing device 14 is also connected to the data processor 16 by the transmission line or wirelessly, for controlling the movement of a cursor on the screen and the operation of the data processor 16.

As for the image-capturing device 14, at least two possible preferred embodiments are disclosed below. In the first embodiment, as shown in FIG. 2, the image-capturing device 14 includes a lens 20, a photo sensing device 22 such as a CCD or a CMOS, and an output unit 24. The image-capturing device 14 continuously captures a first image (not shown) on the screen 18 with the lens 20. The first image is an invisible light and includes special patterns. The photo sensing device 22 converts these special patterns captured by the lens 20 into patterning data and transmits to the output unit 24. The output unit 24 then transmits the patterning data to the data processor 16. Therefore, The data processor 16 can control the movement of the cursor on the screen 18 according to these patterning data.

In the second embodiment, as shown in FIG. 3, the image-capturing device 14 further includes a processing unit 26 and a data transmitter 28. The processing unit 26 is connected to the output unit 24, and the data transmitter 28 is connected to the processing unit 26. The output unit 24 transmits the patterning data continuously captured by the lens 20 to the processing unit 26 for calculation, and then the data transmitter 28 outputs the calculated result to the data processor 16. In other words, the lens 20 captures a first part of the special pattern (the first image) at a first time T1, and then captures a second part of the special pattern at a second time T2. Subsequently, the output unit 24 outputs patterning data of the first part and the second part of the first image to the processing unit 26, and the processing unit 26 calculates the direction and movement of the cursor (not shown) on the screen 18 according to these patterning data captured at the first time T1 and the second time T2. The data transmitter 28 then transmits the movement data of the cursor to the data processor 16. Therefore, the data processor 16 can control the cursor on the screen 18 without further calculation.

Figure 4:
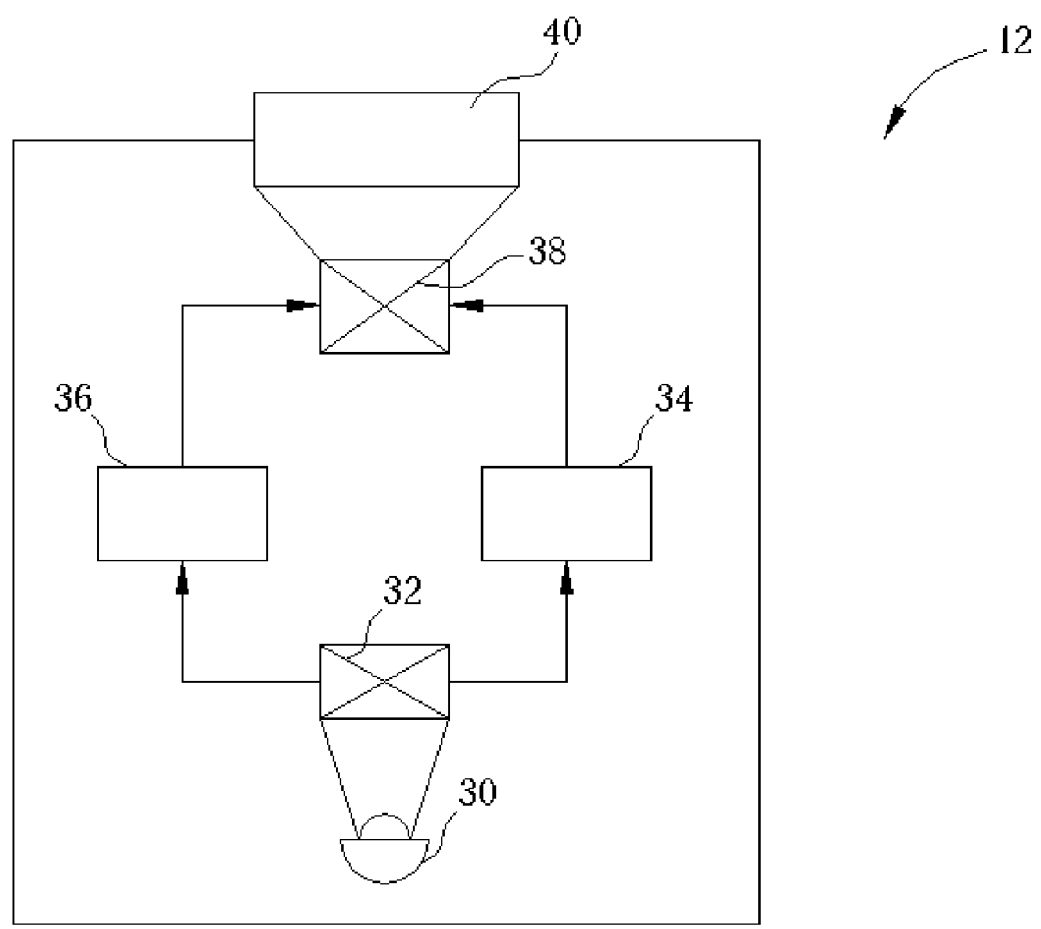
FIG. 4 illustrates the internal structure of a projector according to the present invention.

Please refer to FIG. 4 showing the internal structure of the projector 12. The projector 12 includes a light source 30, a beam splitter 32, a first image-forming device 34, a second image-forming device 36, a prism 38, and a lens 40. The light source 30 of the projector 12 generates both visible and invisible light. The image projected on the screen 18 is the visible light, and the invisible light is always not available in the prior projecting system. Therefore, the special patterns are formed by the invisible light is the present invention, no additional light source for the special pattern is required.

The beam of the light source 30 is divided with the beam splitter 32 into visible and invisible beams. The visible beam is modulated by the second image-forming device 36 to generate a second image including a cursor. The invisible beam is modulated by the first image-forming device 34 so as to generate the first image, that is the special pattern. Eventually, the modulated visible and invisible beams are converged by the prism 38 into a beam projected through the lens 40 onto the screen 18.

The first image-forming device 34 and the second image-forming device 36 can be liquid crystal display (LCD) panels or digital micromirror devices (DMD). The photo sensing device 22 of the image-capturing device 14 can detect the invisible beam. The special patterns formed by the first image include several different items. The image-capturing device 14 can capture the different items at different time in order to calculate the direction and movement of the cursor. The following description takes a square pattern as an example of a pattern captured by the image-capturing device 14 to describe the calculation of the direction and movement of the cursor.

Figure 5:
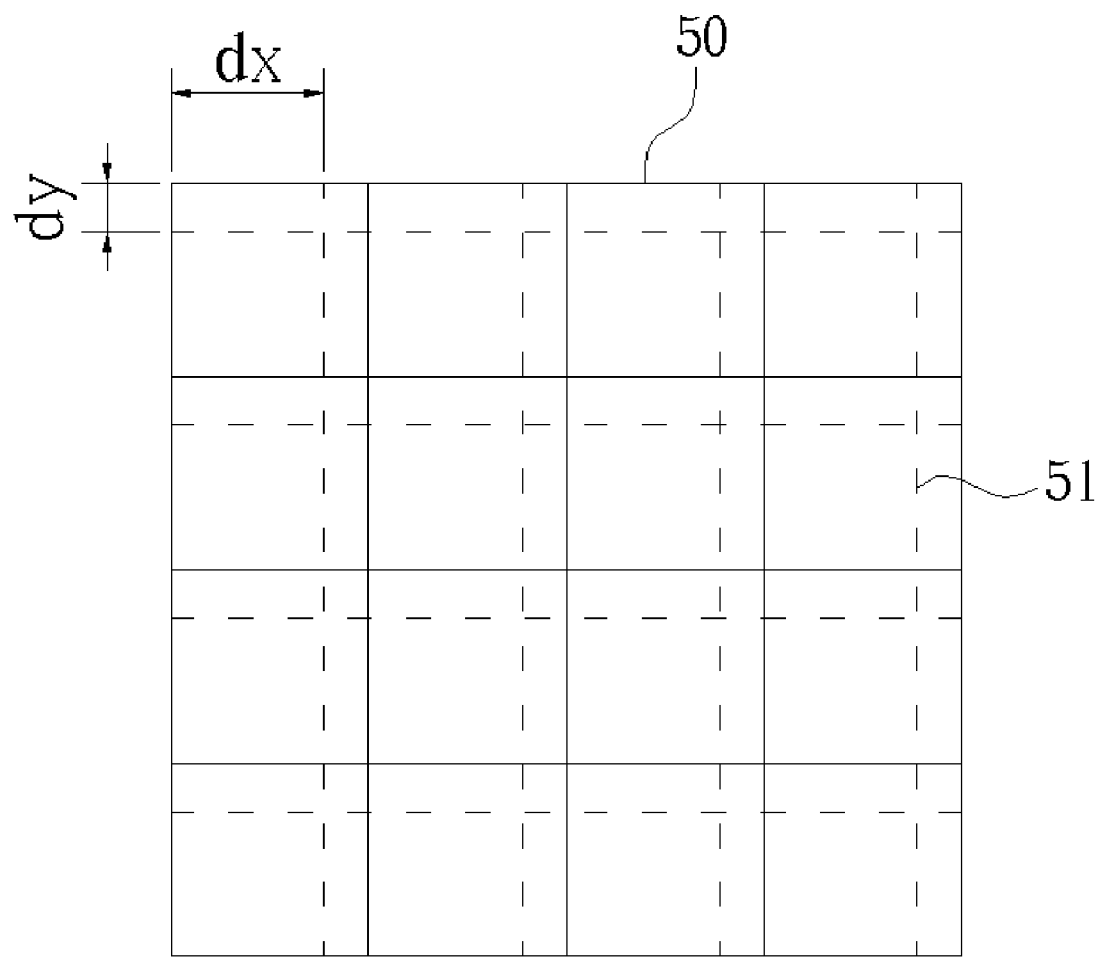
FIG. 5 illustrates the direction and movement of the cursor.

Please refer to FIG. 5 showing the direction and movement of the cursor. The beam splitter 32 divides the light of the light source 30 into visible and invisible beams. The visible beam is modulated by the second image-forming device 36 to generate an image on the screen 18, and the invisible beam is modulated by the first image-forming device 34 to generate the square pattern 51. The size of the squares can be determined by the capturing speed of the image-capturing device 14. The smaller the squares are, the more precise the cursor movement is, but the larger the calculation made by the data processor 16 needs.

In this embodiment, the movement of the cursor does not relate to the real position of the squares on the screen 18, that is the movement of the cursor is calculated by a relative moving distance and moving direction of the squares. The initial point of the movement is the position of the cursor on the screen 18 and the direction and the following movement are calculated according to two patterns captured consecutively by the image-capturing device 14. For instance, when the cursor is moving, the image-capturing device 14 captures different patterns at the first time T1 and the second time T2. As shown in FIG. 5, the solid lined part 50 is the first part of the first image captured by the image-capturing device 14 at the first time T1, and the broken lined part 51 is the second part of the first image captured by the image-capturing device 14 at the second time T2. By overlapping the first part and the second part of the first image, the vertical deviation dx and the horizontal deviation dy of the squares can be determined. Assume dx to be 8 pixels and dy to be 2 pixels, that means the cursor moves left 8 pixels and down 2 pixels.

As described above, the projector 12 utilizes the beam splitter 32 to split the beam of the light source 30 into visible and invisible beams. The visible beam is modulated by the second image-forming device 36 to generate an image, and the invisible beam is modulated by the first image-forming device 34 to generate the special pattern. The prism 38 then converges the two beams into a beam, which then projecting through the lens 40 onto the screen. Further, the image-capturing device 14 captures image on the screen. The photo sensing device 22 of the image-capturing device 14 receives the invisible beam, and patterning data of the special patterns formed by the invisible beam can be transmitted to the data processor 16. The user can use the image-capturing device 14 to scan patterns on the screen 18 so as to determine the direction and movement of the cursor.

In the embodiment of the present invention, a simple 2-dimensional square pattern is provided to determine the direction and movement of the cursor by detecting the deviation of the squares. Obviously, the use of a square pattern is only an example and another pattern may be substituted without departing from the spirit of the invention. However, the method to capture different images are the same. First, the photo sensing device 22 captures a first image at the first time. When the image-capturing device 14 is moved, the photo sensing device 22 captures a second image at the second time. By comparing the two images, the direction and movement of the cursor can be determined. The comparison of the two images can be calculated by the data processor 16 as shown in the FIG. 2. In addition, referring to the FIG. 3, the comparison of the two images can be calculated by the processing unit 26.

In contrast to the prior art, the projecting system according to the present invention allows users to directly control the cursor. The projector projects the invisible beam onto the screen to form the special patterns, and the photo sensing device detects the invisible beams. When the image-capturing device is moved, the data processor can control the movement of the cursor according to the difference of the patterns captured at different times. Conventional controllers such as a mouse, trackball, or joystick need to be operated at a fixed position. A laser light pen is highly movable but harmful to eyes. Therefore, the present invention provides a projecting system with advantages such as ease of operation, high movability, and high safety.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A projecting system for projecting an image onto a screen comprising:
    a projector comprising:
        a light source;
        a beam splitter installed on a side of the light source, for splitting a beam generated by the light source into a visible beam and an invisible beam;
        a first image-forming device for modulating the invisible beam to form a first image;
        a second image-forming device for modulating the visible beam to form a second image having at least one cursor; and
        a prism for projecting the first image and the second image onto the screen; and
    a movable image-capturing device for capturing a part of the first image, the image-capturing device having
        an output unit for outputting the first image captured by the image-capturing device, wherein the output unit outputs a first part of the first image at a first time, outputs a second part of the first image at a second time; and
        a data processor for receiving data from the output unit and changing the position of the cursor according to the first part and the second part of the first image.

2. The projecting system of claim 1 wherein the first image is a square matrix.

3. The projecting system of claim 1 wherein the data processor is connected to the projector through a transmission line.

4. The projecting system of claim 1 wherein the data processor is connected to the projector wirelessly.

5. The projecting system of claim 1 wherein the data processor calculates a moving distance for the cursor according to a difference between the first part and the second part of the first image.

6. The projecting system of claim 5 wherein the projecting system further comprises a computer, and the data processor is installed inside the computer for calculating the moving distance of the cursor.

7. The projecting system of claim 6 wherein the output unit of the image-capturing device transmits the first part and the second part of the first image to the data processor through a transmission line.

8. The projecting system of claim 6 wherein the output unit of the image-capturing device transmits the first part and the second part of the first image to the data processor wirelessly.

9. The projecting system of claim 1 wherein the image-capturing device further comprises a processing unit for calculating a difference between the first part and the second part of the first image so as to calculate a moving distance for the cursor.

10. The projecting system of claim 9 wherein the projecting system is cooperated with a computer, and the image-capturing device further comprises a data transmitter for transmitting the moving distance of the cursor.

11. The projecting system of claim 1 wherein the first image-forming device and the second image-forming device are liquid crystal displays (LCD).

12. The projecting system of claim 1 wherein the first image-forming device and the second image-forming device are digital micromirror devices (DMD).

13. The projecting system of claim 1 wherein the image-capturing device is a charge coupled device (CCD).

14. A method for controlling position of a cursor projected onto a screen in a projection system, the projection system comprising:
    a projector comprising:
        a light source;
        a beam splitter installed on a side of the light source, for splitting a beam generated by the light source into a visible beam and an invisible beam;
        a first image-forming device for modulating the invisible beam to form a first image;
        a second image-forming device for modulating the visible beam to form a second image comprising the cursor; and
        a prism for projecting the first image and the second image onto the screen; and
    a movable image-capturing device for capturing a part of the first image;
    the method comprising:
        the image-capturing device capturing a first part of the first image;
        moving the image-capturing device;
        the image-capturing device capturing a second part of the first image; and
        changing the position of the cursor according to differences between the first part and the second part of the first image.

15. The method of claim 14 further comprising the image-capturing device transmitting the first and parts of the first image to a data processor, the data processor calculating a new position of the cursor according to differences between the first part and the second part of the first image.

16. The method of claim 15 further comprising the image-capturing device wirelessly transmitting the first part and the second part of the first image to the data processor.

17. The method of claim 15 further comprising the data processor transmitting the new position of the cursor to the projector.

18. The method of claim 15 further comprising the data processor wirelessly transmitting the new position of the cursor to the projector.

* * * * *